Figure 1:
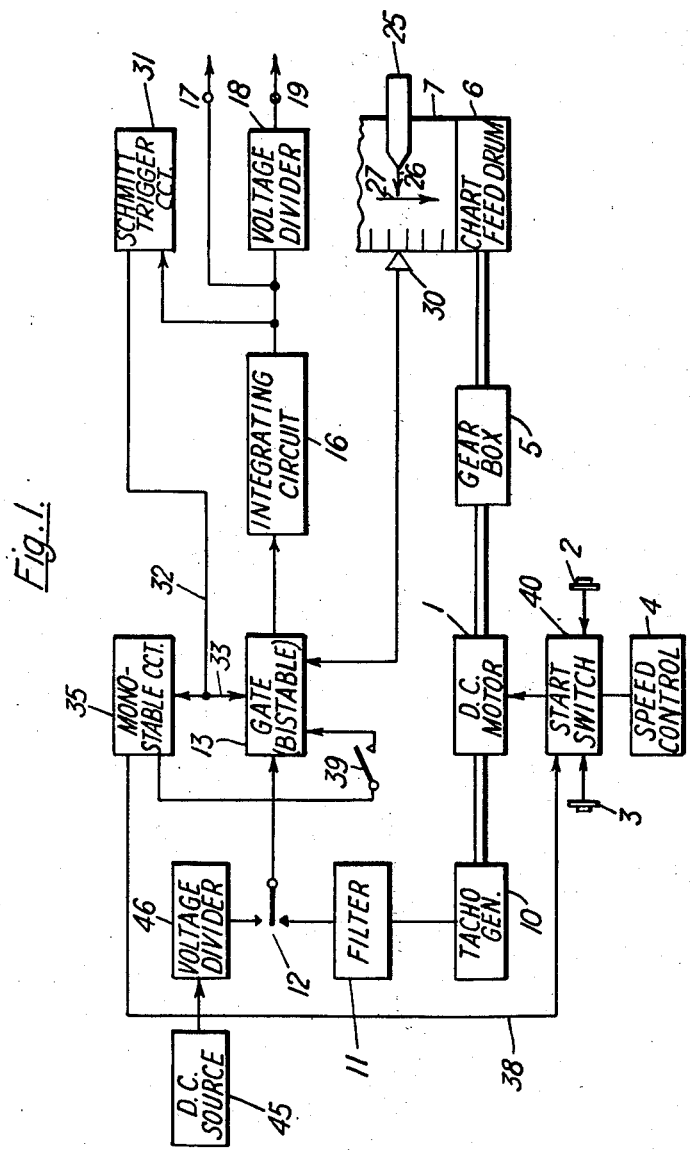

United States Patent Office 3,113,264
Patented Dec. 3, 1963

3,113,264
NUCLEAR MAGNETIC RESONANCE APPARATUS
Leslie Kearton Parker, High Wycombe, England, assignor to The Perkin-Elmer Corporation, Norwalk, Conn., a corporation of New York
Filed Jan. 31, 1961, Ser. No. 86,106
14 Claims. (Cl. 324—.5)

This invention relates to nuclear magnetic resonance apparatus.

In apparatus for investigating the nuclear magnetic resonance of a sample of material, the sample is taken through a resonance, or a series of resonances, either by maintaining a constant applied radio frequency signal and sweeping, i.e. changing propressively over a period, the applied magnetic field, or alternatively by maintaining a constant field and sweeping the radio frequency. The signals derived from the sample during this sweeping are employed to control a marker, such as a stylus, which marks a chart in accordance with these signals, the resultant chart having axes corresponding to time and to amplitude of signals respectively, and showing a number of peaks which indicate the resonance points for the particular sample under investigation.

The manner in which this is accomplished is more fully explained in U.S. Patent Re. 23,950, which issued February 22, 1955, to F. Bloch et al.

Hitherto, difficulties have been experienced in determining from the chart the exact magnitude of the field or the radio frequency (as the case may be) at which any particular resonance takes place, and the present invention is concerned with overcoming these difficulties.

It is therefore the primary object of this invention to correlate the chart movement with the sweep.

Another object is to provide for such correlation by means of a linkage between the sweep circuit and the means for obtaining relative chart movement.

Another object is to provide such apparatus wherein the chart may be calibrated in terms of field or radio frequency.

Another object is to provide means for beginning the sweep at a pre-determined point on the chart.

Another object is to provide such an apparatus wherein the sweeping action may be terminated upon the passage of a pre-selected length of chart.

Another object is to provide such an apparatus wherein a sweep may be periodically repeated.

Another object is to provide such an apparatus where the sweep may be reversed.

The manner in which the foregoing objects are attained will be more apparent from the following description, the appended claims and the two figures of the attached drawings.

According to this invention, the means for effecting the sweep is linked with the means for effecting relative movement, in a direction representing the time axis, between the marker and a support for the chart. With apparatus according to this invention, the sweep and the said relative movement are synchronised and as a consequence the chart may have its time axis calibrated directly and exactly in terms of field or radio frequency. Thus, the field or frequency differences between any two selected peaks may be read off directly, or in the case where no calibration has been made, it may be readily determined.

Preferably the means for effecting the said relative movement is adjustable to change the speed of this movement, the speed of sweep being correspondingly changed. With this feature, a complete and accurate chart may be produced comparatively quickly, for the peaks, which make up only a small proportion of the total trace on the chart, may be produced slowly for the sake of accuracy, whilst the rest of the trace, which is of comparatively little interest, may be produced at high speed. This is to be contrasted with prior apparatus in which synchronisation between speeds of sweep and relative movement is lacking. With such prior apparatus, any change in speed of the apparatus (i.e. the change in speed of both the sweep and the said relative movement) is liable to cause a sacrifice in the accuracy of the results obtained.

Preferably means is provided to synchronise the beginning of a sweep with the passage past the marker of a point on the chart. With such a synchronising means, it is possible to determine directly from the chart not only differences in field or frequency but the actual values of field or frequency if the value of field or frequency prior to the start of sweep is known.

Preferably the means for effecting the said relative movement, and the means for effecting the sweep are both reversible so as to permit a trace to be made on a chart in a forward and in a reverse direction. This also permits any particular part of the trace to be made again in the original direction.

When a cathode ray oscilloscope is provided in the apparatus, it is preferred that the means for effecting the said relative movement be linked with the means for producing the time base of the oscilloscope. The means for producing the time base is in fact conveniently constituted by the means for effecting the sweep, although a voltage divider may be provided if the voltages required to effect sweep of the field or frequency and to produce the time base differ. The beginning of the time base is preferably synchronised with the beginning of the field or signals sweep by the means which synchronises the beginning of this sweep with the passage past the marker of a point on the chart.

Figure 2:
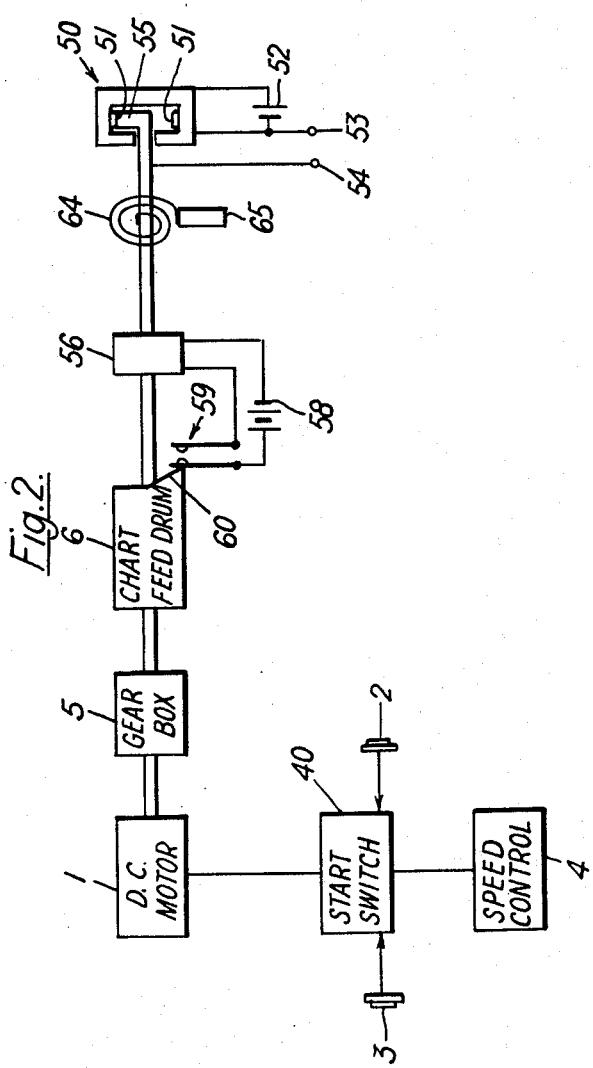

A spectrometer according to the invention will now be described, by way of example, with reference to the accompanying drawings in which:

FIGURE 1 is a diagram showing the arrangement for moving the chart and also the circuits for effecting the sweep; and FIGURE 2 shows a modification.

Referring first of all to FIGURE 1, this shows a direct current reversible electric motor 1, arranged to be started and stopped by means of push buttons 2 and 3, and having a speed control 4 of any well known type. This motor 1 is arranged to drive through a gear box 5 a rotary drum 6 on which a chart may be mounted for rotation about the axis of the drum 6. A chart is shown diagrammatically at 7, being shown as if laid out flat for ease in explanation. In practice, however, it will of course be mounted on the curved surface of the drum. The motor 1 also drives a tachogenerator 10 which generates a voltage having a magnitude directly proportional to the speed of the motor 1. This voltage is smoothed by a conventional filter circuit 11 and is then applied through a two-way switch 12 to a gate circuit 13, that is to say a circuit which is bistable. When this circuit has been actuated to bring it into a particular one of its two stable conditions, the smoothed voltage from the tachogenerator 10 is able to pass to an integrating circuit 16 which therefore produces a progressively increasing output. This output is applied directly to the time base plates of a cathode ray oscilloscope connected to a terminal 17, and this same output is also applied through a voltage divider 18 to a terminal 19 to which an electro magnet of the magnet system of the spectrometer, referred to for convenience as the sweep coils, is connected, so as to bring about sweep of the magnetic field. The gradually increasing output at the terminal 19 serves to increase gradually the magnetic field of the spectrometer applied to the sample under investigation.

In this way, the sample may be taken through a resonance or a number of resonances and the signal obtained at each resonance is applied both to the signal plates of the oscilloscope and to move a marker 25 in a transverse direction, as shown by the arrow 26 so as to produce on the chart 7 a peak corresponding to the resonance. The chart 7 itself is moved in the direction shown by the arrow 27 and as a consequence the peaks produced are spread out over the chart. The movement of the marker 25 in the direction shown by the arrow 26 may be brought about in a conventional manner by the signals derived from the sample. These signals may be derived from the sample in a conventional manner, being obtained either by the absorption method, in which the same coil is employed for the input radio frequency signal and for the output signal, or by the alternative method in which separate coils are provided for the two signals.

The actuation of the gate circuit 13 to start integration is brought about by a photoelectric cell 30 disposed above the drum. This cell 30 is arranged at the same point of the circumference of the drum 6 as the marker 25, so that when a small dark area specially provided on the chart 7 passes the marker 25 the cell 30 responds and produces a signal which actuates the gate circuit 13 to initiate integration. This dark area on the chart thus corresponds to the beginning of sweep and represents the origin of the chart 7. The magnitude of the magnetic field corresponding to this origin is of course known.

The output from the integrating circuit 16 is applied not only to the oscilloscope plates and to the sweep coils, but also to a Schmitt trigger circuit 31, the output of which is applied to the gate circuit 13 through conductors 32 and 33 to close the gate circuit 13 and thus stop further integration. The Schmitt trigger circuit 31 may be adjusted to change the time at which the gate circuit 13 is closed and thereby to change the length of the sweep. The output from this trigger circuit 31 is also applied to a monostable circuit 35 which operates only after a delay of 3 seconds from the receipt of the signal from the Schmitt trigger circuit 31. This monostable circuit 35 is connected through a conductor 38 to the energising circuit, indicated at 40, for the motor 1 and through a switch 39 to the gate circuit 13. Normally the switch 39 is open so that some 3 seconds after the Schmitt trigger has operated, a signal is applied to the circuit 40 to break the circuit and stop the motor. Thus with the switch 39 in the position shown a single sweep is brought about. If it is desired to have a trace on the oscilloscope but not on the chart, the motor 1 may be stopped, and the voltage to be integrated may be provided by a direct current source 45 of known substantially constant amplitude applied through a voltage divider 46 and the two-way switch 12 to the gate circuit 13. In operation, therefore, this switch 12 is first operated to connect the voltage divider 46 to the gate circuit 13, and the switch 39 is closed. The monostable circuit 35, which is in its stable condition, thus applies a signal to the gate circuit 13, and this opens the circuit so that integration starts. This proceeds until the Schmitt trigger circuit 31 reaches its set level, when this circuit 31 fires and applies one impulse to the gate circuit 13 to close the gate and stop integration and another impulse to the monostable circuit 35 which is thereby driven into its abnormal condition in which it stays for three seconds. At the end of this period, the monostable circuit 35 reverts to its normal condition and thereby feeds a start impulse to the gate circuit to open this circuit once more to permit integration to start once again. This is repeated indefinitely.

The gate circuit 13 is arranged so that, when open, the voltage from the voltage divider 46 is applied to the circuit 16 for integration, but when closed the gate circuit 13 short circuits the input to the integrating circuit 16 so that the voltage input for this circuit rapidly relaxes to zero. As a result of this the voltage derived from the circuit 16 is a sawtooth voltage. If the Schmitt trigger circuit 31 is set at a high level a large sawtooth may be obtained, but by setting the level lower this splits up into a number of smaller sawteeth of smaller amplitude and these are employed to give on the oscilloscope a selected part of a trace. By changing the level at which the circuit 31 is set to fire, therefore, the length of the trace on the oscilloscope may be changed.

This trace is examined to enable the degree of homogeneity of the magnetic field applied to the sample under investigation to be determined. Suitable corrections, which do not constitute part of the present invention, are made until the trace indicates that a homogeneous field has been produced.

The two-way switch 12 is then operated to disconnect the D.C. source 45 and to connect the filter 11 to the gate circuit 13. The motor 1 is then started and its speed control and the Schmitt trigger circuit 31 are adjusted until the trace on the oscilloscope shows the peak or peaks which are to be investigated.

The switch 39 is then opened so that the only actuating signals for the gate circuit 13 to open the gate are now those derived from the cell 30. When this cell views the small dark area on the chart, the gate circuit 13 is opened and sweep starts. If the voltage divider 18 has been adjusted so that the sweep coils and the oscilloscope plates receive the same potential, then the trace obtained on the chart will be the same as that obtained on the oscilloscope. If it is desired, however, to investigate only a proportion of the trace shown on the oscilloscope the voltage divider 18 is adjusted accordingly. In this way, any part of the trace shown on the oscilloscope may be investigated in detail and may be recorded on the chart 7. On each chart so obtained, the small dark area represents the origin at which the sample is being subjected to known conditions of field and frequency. The chart or the drum itself may be marked directly in terms of field strength.

If it is desired to repeat any particular small portion of the trace, the motor 1 is reversed to change the direction of rotation of the drum 6. During this reversal, the integrating circuit 16 produces a gradually decreasing voltage so as to sweep the magnetic field in the reverse direction and the marker thus retraces its original track. The marker 25 may, of course, be raised from the chart 7 if this reversed trace is not required. The motor is then reversed again so as to move in its original direction and the original trace is reproduced once more. This trace may be superposed on the original trace, although in general it will be preferred to displace it laterally, that is to say along the signal amplitude axis so that the two traces are produced one above the other for comparison purposes.

The speed control 4 may be adjusted to change the speed of the motor 1 during the production of the trace on the chart so that the peaks are produced slowly for the sake of accuracy, whilst the chart is moved rapidly between the peaks.

In the modified arrangement, shown in FIGURE 2, the D.C. motor 1, with its speed control 4, its push buttons 2 and 3 operating the circuit 40, the gear box 5, and the drum 6 are the only parts of the apparatus shown in FIGURE 1 which are retained. The means for effecting the sweep of the magnetic field is in this case a potentiometer 50 which has an annular resistance 51 which is fed with current by a source 52 connected across the resistance. The output from the potentiometer 50 is taken from terminals 53 and 54, the first of which is connected to one end of the resistance 51 whilst the other is connected to a rotary arm 55 which is arranged to sweep over the resistance 51. The arm 55 is driven through an electromagnetic clutch 56 and the gear box 5. Thus, as the drum 6 is rotated a voltage produced under the control of the potentiometer 50 and appearing across the output terminals 54 and 53 of the potentiometer 50 gradually increases, so that this voltage is suitable for effecting sweep of the magnetic field and for producing the time base of the oscilloscope. The voltage divider 18 may be employed if desired as in the FIGURE 1 arrangement. The clutch 56 is operated, to effect drive of the arm 55, by a source of potential 58 applying current to the clutch 56 through a switch 59. This switch is closed by means of a cam surface 60 which is disposed on the end face of the drum 6 and which is shown exaggerated for the sake of clarity. As the cam surface 60 rotates, it releases the switch 59, which then springs open, thereby disengaging the clutch 56 and stopping the rotation of the arm 55. The latter is then rapidly returned to its initial position by means of a coil spring 64 fixed at one end to the arm 55 and at the other end to a fixed support 65. Further rotation of the drum 6 and its cam surface 60 causes closure of the switch 59 again, with a consequential gradual increase in voltage across the terminals 53 and 54. A continuous sawtooth wave is thus produced which is applied to the sweep coils. In a modification the parts 56, 58, 59, 60, 64 and 65 are omitted and the sawtooth wave is produced simply by the continuous rotation of the arm 55, producing the gradually increasing voltage during its sweep along the resistance 51 and a rapid return to the initial voltage as the arm passes from one end of the resistance 51 to the other end, which is adjacent.

I claim:

1. In nuclear magnetic resonance apparatus including sweep means for taking a sample through a resonant condition, chart support means, chart marking means responsive to signals derived from said sample, drive means for providing relative motion along the time axis between said chart support means and said chart marking means, and linking means operatively interconnecting said sweep means and said chart drive means, the improvement wherein said linking means includes synchronizing means adapted to synchronize the beginning of the sweep with the passage past the chart marking means of a preselected point of a chart supported by said chart support means.

2. The apparatus of claim 1 wherein the drive means is adjustable to vary both the speed of the sweep and the relative speed between the chart support means and the chart marking means.

3. The apparatus of claim 1 wherein both of said sweep means and said drive means are reversible.

4. The apparatus of claim 1 wherein said linking means includes means for supplying a time base voltage to a cathode ray oscilloscope.

5. The apparatus of claim 1 wherein said drive means comprises an electric motor, said linking means comprises generating means adapted to produce a first voltage proportional to the speed of said motor, and said sweep means comprises integrating circuit means responsive to said first voltage to produce a second voltage proportional to the integral of said first voltage.

6. The apparatus of claim 1 wherein said linking means includes a potentiometer driven by said drive means and electrically connected to said sweep means.

7. The apparatus of claim 6 wherein said linking means includes a clutch interposed between said drive means and said potentiometer, said clutch being operatively connected to be engaged and disengaged by the relative motion between said chart support means and said chart marking means.

8. The apparatus of claim 6 wherein said potentiometer comprises an arcuate resistance and a rotatable wiper arm.

9. The apparatus of claim 7 wherein said chart support means comprises a rotatable drum.

10. Nuclear magnetic resonance apparatus which comprises rotatable chart support means; chart marking means responsive to signals derived from a sample under test; chart drive motor means adapted to rotate said chart support means; tachogenerator means mechanically coupled to said chart drive motor means; integrating circuit means responsive to the output of said tachogenerator means; sweep voltage supply means electrically connected to receive the output of said integrating circuit means; a gate circuit electrically connected between said tachogenerator means and said integrating circuit means; and actuating means adapted to actuate said gate circuit to begin a sweep, said actuating means being responsive to the passage past said marking means of a point on a chart attached to said chart support means.

11. The apparatus of claim 10 wherein said actuating means comprises a photoelectric cell disposed adjacent said chart support means.

12. Nuclear magnetic resonance apparatus which comprises rotatable chart support means; chart marking means responsive to signals derived from a sample under test; chart drive motor means adapted to rotate said chart support means; tachogenerator means mechanically coupled to said chart drive motor means; integrating circuit means responsive to the output of said tachogenerator means; sweep voltage supply means electrically connected to receive the output of said integrating circuit means; a gate circuit electrically connected between said tachogenerator means and said integrating circuit means; actuating means adapted to actuate said gate circuit to begin a sweep, said actuating means being responsive to the passage past said marking means of a point on a chart attached to said chart support means; and trigger circuit means adapted to receive a signal from said integrating circuit means and close said gate circuit to end the sweep.

13. The apparatus of claim 12 wherein the trigger circuit means is adjustable to vary the sweep.

14. The apparatus of claim 13 wherein said chart support means comprises a rotatable drum.

References Cited in the file of this patent

FOREIGN PATENTS 745,873     Great Britain _____ Mar. 7, 1956

OTHER REFERENCES

Aiken et al.: Control Engineering, vol. 4, No. 6, June 1957, pp. 105 to 113 incl.

Gutowsky et al.: The Review of Scientific Instruments, vol. 24, No. 8, August 1953, pp. 644 to 652 incl.

Anderson: Physical Review, vol. 76, No. 10, Nov. 15, 1949, pp. 1460 to 1470 incl.

Waugh: Annals of the New York Academy of Sciences, vol. 70, Art. 4, pp. 920 to 922, June 16, 1958.

Durand: The Review of Scientific Instruments, vol. 29, No. 6, June 1958, pp. 534 and 535.